United States Patent [19]

Holt et al.

[11] Patent Number: 5,108,966

[45] Date of Patent: Apr. 28, 1992

[54] PROCESS FOR PRODUCING WURTZITIC OR CUBIC BORON NITRIDE

[75] Inventors: J. Birch Holt, San Jose; Donald D. Kingman, deceased, late of Danville, by Nina V. Kingman, administratrix; Gregory M. Bianchini, Livermore, all of Calif.

[73] Assignee: Regents of the University of California, Oakland, Calif.

[21] Appl. No.: 497,688

[22] Filed: Mar. 23, 1990

[51] Int. Cl.$^5$ .................. C04B 35/38; C01B 21/064
[52] U.S. Cl. ................................ 501/96; 423/290; 51/307
[58] Field of Search ............... 423/290, 289; 501/96; 51/307

[56] References Cited

U.S. PATENT DOCUMENTS

| | | | |
|---|---|---|---|
| 2,865,715 | 12/1958 | Kamlet | 423/290 |
| 3,233,988 | 2/1966 | Wentorf, Jr. et al. | 423/290 |
| 4,014,979 | 3/1977 | Dremlin et al. | 423/290 |
| 4,016,244 | 4/1977 | Susa et al. | 423/290 |
| 4,188,194 | 2/1980 | Corrigan | 264/65 |
| 4,231,980 | 11/1980 | Corrigan | 264/84 |
| 4,443,420 | 4/1984 | Sato et al. | 423/290 |
| 4,446,242 | 5/1984 | Holt | 501/96 |
| 4,459,363 | 7/1984 | Holt | 423/406 |

FOREIGN PATENT DOCUMENTS

| | | | |
|---|---|---|---|
| 240913 | 10/1987 | European Pat. Off. | |
| 2108452 | 2/1970 | Fed. Rep. of Germany | 423/290 |
| 48212 | 12/1982 | France | 423/290 |
| 107468 | 6/1983 | Japan | |

*Primary Examiner*—Michael Lewis
*Assistant Examiner*—Stephen G. Kalinchak
*Attorney, Agent, or Firm*—Paul R. Martin; Henry P. Sartorio

[57] ABSTRACT

Disclosed is a process for producing wurtzitic or cubic boron nitride comprising the steps of:

[A] preparing an intimate mixture of powdered boron oxide, a powdered metal selected from the group consisting of magnesium or aluminum, and a powdered metal azide;

[B] igniting the mixture and bringing it to a temperature at which self-sustaining combustion occurs;

[C] shocking the mixture at the end of the combustion thereof with a high pressure wave, thereby forming as a reaction product, wurtzitic or cubic boron nitride and occluded metal oxide; and, optionally

[D] removing the occluded metal oxide from the reaction product.

Also disclosed are reaction products made by the process described.

24 Claims, No Drawings

PROCESS FOR PRODUCING WURTZITIC OR CUBIC BORON NITRIDE

The United States Government has rights in this invention pursuant to Contract No. W-7405-ENG-48 between the U.S. Department of Energy and the University of California for the operation of the Lawrence Livermore National Laboratory.

FIELD OF THE INVENTION

This invention relates to a process for producing cubic boron nitride. More specifically, it relates to a process for making wurtzitic or cubic boron nitride utilizing inexpensive starting compounds to produce hexagonal boron nitride which in turn is converted to wurtzitic or cubic boron nitride by the use of a high pressure shock wave.

BACKGROUND OF THE INVENTION

Wurtzitic and cubic boron nitrides are extremely hard refractory materials which possess superior properties as compared to diamond when used for grinding or cutting of materials containing nickel, cobalt or iron. These metals, i.e., nickel, cobalt and iron, and their alloys, are known to chemically attack diamond at the hot cutting edge. Thus, cutting tools with diamond cutting edges, deteriorate quickly when used to cut these metals or their alloys and are, therefore, expensive to use.

Though expensive, diamonds are used for cutting tools because boron nitrides, such as cubic born nitride, or wurtzitic boron nitride, are even more expensive overall.

Wurtzitic and cubic boron nitrides are expensive because they are not naturally occurring, and the process used to make them involves the use of expensive high temperature-high pressure equipment and reactants that are relatively expensive.

Boron nitride can be found in at least five different states, i.e., hexagonal boron nitride, rhombohedral boron nitride, graphitic boron nitride, wurtzitic boron nitride, and cubic boron nitride. Of the five states, cubic boron nitride is most desirable because it is the hardest. It is suitable for use not only as a cutting tool, but also as a crucible in the melting of metals, as a polishing material and the like.

THE PRIOR ART

U.S. Pat. No. 4,443,420, discloses a cubic system boron nitride which is produced by a shock wave compression method in which a thermodynamically stable shock wave having a compressing pressure of from about 100 to 1500 kbar is applied to a rhombohedral system boron nitride to convert the rhombohedral system boron nitride to cubic system boron nitride. The thermodynamically stable pressure is applied by propelling a flyer plate or projectile plate by an explosion wave generated by detonation of an explosive. The flyer plate collides with a sample vessel to produce a strong shock wave. When the shock wave pressure is imparted to the starting material, the rhombohedral system boron nitride is converted to cubic system boron nitride.

U.S. Pat. No. 4,014,979 relates to a method of producing highly imperfect wurtzitic boron nitride with enhanced activity, which consists of preparing a mixture of a powder of graphitic boron nitride and a sufficient amount of a water or aqueous alkaline additive to fill the pores between the particles of the graphitic boron nitride, and subjecting the mixture to the action of a shock wave with a pressure of not less than 100 kbar. The shock wave is applied by the use of an explosive charge.

U.S. Pat. No. 4,446,242 describes a process of synthesizing refractory metal nitrides using a solid source of nitrogen. In the process, a metal azide is mixed with an amount of a transition metal of the III B, IV B groups, a rare earth metal, or a mixture thereof, igniting the resulting mixture and forming a refractory nitride composition.

Sodium azide is the preferred azide for use in the process, and preferred metals include: Sc, Y, La, Ti, Zr, Hf, Yb, Er, and the like.

U.S. Pat. No. 4,016,244 describes a method of synthesizing cubic boron nitride from hexagonal boron nitride. In this patent, it is disclosed that if water is incorporated into the raw material (graphitic hexagonal boron nitride) in an amount of at least 3 percent by weight, cubic boron nitride can be obtained under lower temperature and lower pressure conditions than in conventional methods. Even so, unacceptably high pressures and temperatures are required.

European Patent Application 0,240,913 discloses a method of manufacturing a sintered compact of cubic boron nitride which is accomplished by mixing alkaline earth metal boron nitride powder with hexagonal boron nitride powder, forming the mixture into a compact, causing it to adsorb from 0.005 to 1.000 percent by weight water, then sintering it at a temperature of 1200° C. or more, and under high pressure. Hexagonal boron nitride is converted to cubic boron nitride by the process described.

As can be seen from the processes described in the prior art, an essential requirement, in most cases, is that the process be conducted at high temperatures and under high pressure. This is expensive and inefficient. The quantity of product which can be made is limited.

It would be desirable in the art to develop a process for making cubic boron nitride using inexpensive starting materials. It would also be desirable to develop a process which eliminates the need for high pressures and other expensive process conditions.

SUMMARY OF THE INVENTION

An object of the invention is to provide an economical process of producing wurtzitic and cubic boron nitride using inexpensive starting materials.

Another object of the invention is to provide a process of producing wurtzitic and cubic boron nitride which does not require continuous high temperatures or high nitrogen pressures.

Still another object of the invention is to provide a quick and efficient process for producing wurtzitic and cubic boron nitride.

Additional objects, advantages and novel features of the invention will be set forth in the description which follows. The objects and advantages of the invention may be realized and obtained by means of the instrumentalities and combinations particularly pointed out in the appended claims.

To achieve the foregoing and other objects, and in accordance with the purpose of the present invention, as embodied and broadly described herein, the process for producing wurtzitic and cubic boron nitride comprises the steps of:

[A] preparing an intimate mixture of powdered boron oxide, a powdered metal selected from the group consisting of magnesium and aluminum, and a powdered metal azide;

[B] igniting the mixture and bringing it to a temperature at which self-sustaining combustion occurs, whereby nitrogen is liberated from the metal azide and reacts with the boron formed during the combustion process to form hexagonal boron nitride; [C] shocking the mixture at the end of the combustion thereof with a high pressure wave, thereby converting said hexagonal boron nitride to wurtzitic or cubic boron nitride and forming as a reaction product, a material containing wurtzitic or cubic boron nitride and an occluded metal oxide; and, optionally, [D] leaching the occluded metal oxide from the reaction product material.

The above described process employs economical starting materials and an in-situ source of nitrogen, eliminating the necessity of using high temperature equipment.

Additionally, conversion of the starting boron oxide to the refractory wurtzitic or cubic boron nitride is maximized. The process of the present invention is energy efficient, and requires much less time than processes which are currently used.

In another aspect, the invention encompasses the reaction products of the method of the invention, i.e., a composite of wurtzitic or cubic boron nitride containing occluded metal oxides, and wurtzitic or cubic boron nitride obtained after removal of the occluded metal oxides.

DETAILED DESCRIPTION OF THE INVENTION

In carrying out the process of the invention, the first step is to prepare a mixture of powdered boron oxide, powdered magnesium or aluminum and a powdered metal azide. The individual compounds are obtained, and intimately mixed with each other until a uniform mixture is obtained. Stoichiometric ratios are preferred.

The individual components of the mixture are all commercially available in powder form. Boron oxide can be obtained from the Borax Company, aluminum or magnesium from Cerac, Inc., and metal azide from the Alfa Products*company.

Magnesium is the preferred metal for use in the process.

Nitrogen gas is required in the process to react with boron. The nitrogen gas is preferably generated in-situ during the reaction. A solid nitrogen compound can be used to generate nitrogen gas in-situ.

A source of solid nitrogen is a metal azide. Suitable metal azides are formed from the alkaline earth metals and the alkali metals, as listed in Table I below. The preferred azide is $NaN_3$.

TABLE I

| | |
|---|---|
| $NaN_3$ | $Be(N_3)_2$ |
| $KN_3$ | $Mg(N_3)_2$ |
| $LiN_3$ | $Ba(N_3)_2$ |
| $CaN_3$ | $Sr(N_3)_2$ |
| $RbN_3$ | $Br(N_3)_2$ |
| $CoN_3$ | |

The azides useful in the process of the present invention are readily prepared from hydrazoic acid and the oxide or carbonate of the metal, or by metathesis of the metal sulfate with barium azide.

Sodium azide is readily prepared by reacting $NaNH_2$ with $N_2O$, as illustrated in the following equation:

$$2 NaNH_2 + N_2O \rightarrow NaN_3 + NaOH + NH_3$$

A complete description of this process is found in B.T. Fedoroff, et al., Encyclopedia of Explosives and Related Items, pages A601 to A619 [Picatinny Arsenal, Dover, N.J., USA 1960], incorporated herein by reference.

The metal azide is mixed with at least a stoichiometric amount of boron oxide and magnesium or aluminum. Excesses of the metal azide can be used, to ensure complete reaction of the nitrogen which is liberated on heating, with the boron which is liberated.

Preferably, the materials in the mixture will have particle sizes ranging from about 10 to about 30 microns; however, mixtures of compounds having particle sizes falling outside of this range are also suitable for use.

Once the mixture is obtained, it is ignited so that the top or bottom surface of the mixture is brought to the ignition temperature of the composition. Once this temperature is reached, the process becomes self-sustaining. Suitable methods for heating or igniting the mixture include use of heated tungsten coils or carbon strips; pulsed laser beams; electric arcs; focused high intensity radiation lamps, and the like.

Although a sufficient amount of nitrogen for the process is obtained from the metal azide, a nitrogen atmosphere is preferably additionally employed during the synthesis. A nitrogen atmosphere of about 1 atmosphere is preferred. If desired, however, the reaction can be conducted in vacuum.

Once the mixture is ignited, and combustion begins, the temperature of the mixture rises to a point where the metal azide decomposes, and nitrogen is liberated therefrom. The liberated nitrogen reacts with the boron which is produced by reduction of boron oxide with the active metal, Mg or Al. The steps believed to take part in the reaction are shown below, when magnesium is used as the reducing element, and sodium Azide the source of nitrogen.

1) $3B_2O_3 + 9Mg \longrightarrow 6B + 9MgO$  ⎫ Partial
2) $6B + 2NaN_3 \longrightarrow 6BN + 2Na$  ⎭ Reactions 3) $3B_2O_3 + 9Mg + 2NaN_3 \longrightarrow$  ⎫ Total
   $6hexBN + 9MgO + 2Na$  ⎭ Reaction The temperature of combustion will vary depending to some extent on the specific ratios of starting compounds in the mixture, but in general will range from about 1800° to about 2100° C. The combustion of the mixture occurs very fast and is completed within seconds after ignition commences.

While the mixture can, if desired, be ignited when the mixture is in a loose powder stage, preferably the mixture is formed into a compact prior to ignition. The compact is made by compressing the loose powder into a formed shape conforming to the dimensions of a specific die. Normally, the shape will be that of a flat tablet or wafer, having a dimension wider than it is thick.

After completion of combustion, which is determined by a signal from a thermocouple located at the bottom surface of the burning compact, the completely combusted mixture is subjected to a shock wave which has the effect of converting hexagonal boron nitride, produced as a consequence of the combustion of the mixture, to a reaction product material which is wurtzitic or cubic boron nitride occluded with a metal oxide, i.e., magnesium oxide, or aluminum oxide.

The shock wave parameters applicable to this invention are described in U.S. Pat. No. 4,014,979. That patent is hereby incorporated by reference to the extent provided by law. It has been found in conjunction with the process of this invention, that shock waves ranging between about 100 and 300 kbar in pressure result in the production of wurtzitic or cubic boron nitride. It is essential that the shock waves be applied to the combustion mixture as uniformly as possible, and normally this is accomplished by means of an explosive device, or a gas gun.

After the combustion products are subjected to the shock wave, which produces wurtzitic or cubic boron nitride and occluded metal oxide, the MgO is thereafter optionally leached from the reaction product, yielding substantially pure wurtzitic or cubic boron nitride.

The leaching can be done by subjecting the reaction product to a suitable acid such as hydrochloric acid or phosphoric acid.

It should be understood by those skilled in the art that the product obtained after the shock wave is Propagated through the combustion material can include either wurtzitic boron nitride, or cubic boron nitride. The specific product obtained depends upon the combustion temperature and pressure of the shock wave. In general, lower combustion temperatures and shock wave pressures result in the production of wurtzitic boron nitride, rather than cubic boron nitride. Because cubic boron nitride is the preferred nitride, the process is preferably carried out at sufficiently high combustion temperatures and shock wave pressures to insure formation of cubic boron nitride.

The combustion temperature may be decreased, if desired, by the addition of magnesium oxide as a diluent. The shock wave pressure may be controlled by the proper selection of the explosive charge.

The following examples are illustrative of the invention, and are not to be regarded as limiting its scope, which is defined in the appended claims.

EXAMPLE 1

A powder mixture is prepared by charging 18.5 grams powdered $B_2O_3$, 19 grams powdered Mg, and 12.5 grams powdered $NaN_3$ into a container and mixing thoroughly. The particle size of $B_2O_3$ is 30 micron, Mg is 15 micron, and $NaN_3$ is 30 micron. Next, the powder mixture is cold-pressed into compacts with a L/D ratio of 0.5. One of the cold-pressed compacts is placed into a six-inch diameter stainless steel die with grafoil lining the sides and bottom of the cavity. Situated at the bottom of the die cavity, is a horizontal tungsten coil which acts as an igniter for the combustion reaction. Electric leads, which are insulated, extend down through the bottom of the die and are connected to an 5 appropriate power source. The compact is ignited from the bottom, and a combustion wave rapidly propagates to the top surface converting the reactants into hexagonal boron nitride, magnesium oxide and sodium, the latter which vaporizes off. The completion of the reaction is detected by a W-Re thermo couple bead positioned at the top surface of the reactant compact. While the combustion products are still at a high temperature (approximately 2937° C.) and at the time the combustion wave reaches the top surface of the compact, a steel plug is driven into the reactant compact with an explosive charge producing a shock wave. The shock wave has a pressure of 150 kbar. The shock wave transforms the hexagonal boron nitride into the cubic form. The impurity gases adsorbed on the powder (water vapor) and the sodium are vented through slots in the die wall prior to generation of high pressures.

The product, which is a multi-phase composite of cubic boron nitride and magnesium oxide powder, is leached with hydrochloric acid, which leaches out the magnesium oxide.

EXAMPLE 2

The procedure of Example 1 is repeated, using a starting mixture of 34.9 g $B_2O_3$, 36.6g Mg, and 6.8 g MgO, and 21.7g $NaN_3$. The temperature of combustion is 2825° C., and the shock wave pressure is 125 kbar. The product produced is 24.9 g wurtzitic boron nitride occluded with 67.4 g MgO. The occluded is removed by leaching with HCl.

EXAMPLE 3

The procedure of Example 1 is repeated starting with a mixture of 41.7 g $B_2O_3$, 32.3 g Al, and 26.0 g $NaN_3$.

The temperature of combustion is 2970° C., and the shock wave pressure is 200 kbar. The product produced is 29.7 g cubic boron nitride occluded with 61.1 g $Al_2O_3$. The $Al_2O_3$ is not removed.

EXAMPLE 4

The procedure of Example 1 is repeated starting with a mixture of 34.6 g $B_2O_3$, 26.9 g Al, 16.9 g $Al_2O_3$, and 21.6 g $NaN_3$.

The temperature of combustion is 2660° C., and the shock wave pressure is 100 kbar. The product is 24.7 g wurtzitic boron nitride occluded with 67.7 g $Al_2O_3$. The $Al_2O_3$ is not removed.

The foregoing description of preferred embodiments of the invention has been presented for purposes of illustration and description. It is not intended to be exhaustive or to limit the invention to the 5 precise form disclosed, and obviously many modifications and variations are possible in light of the above teaching. The embodiments were chosen and described in order to best explain the principles of the invention and its practical application, to thereby enable others skilled in the art to best utilize the invention in various embodiments and with various modifications, as are suited to the particular use contemplated. It is intended that the scope of the invention be defined by the claims appended hereto.

We claim:

1. A process for producing wurtzitic or cubic boron nitride comprising the steps of:
   [A] preparing an intimate mixture of powdered boron oxide, a powdered metal selected from the group consisting of magnesium and aluminum, and a powdered metal azide;
   [B] igniting said mixture and bringing it to a temperature at which self-sustaining combustion occurs;
   [C] shocking said mixture at the end of the combustion thereof, while the reaction products are still at a temperature elevated by the heat from said combustion, with a high pressure wave generating a pressure of at least about 100 kbar on said mixture, thereby forming as a reaction product, wurtzitic or cubic boron nitride and occluded metal oxide.

2. The process of claim 1 wherein said mixture in (B) is heated to a temperature of at least about 1800° C.

3. The process of claim 1 wherein said occluded metal oxide is MgO and is removed by leaching said n product with HCl.

4. The process of claim 1 wherein prior to ignition, said mixture is compacted together.

5. The process of claim 1 wherein said mixture of (A) has a particle size ranging from about 10 to about microns.

6. The process of claim 1 wherein said powdered boron oxide, powdered metal, and powdered metal azide are initially present in stoichiometric ratios.

7. The process of claim 1 wherein said metal azide is sodium azide.

8. The process of claim 1 wherein said metal is aluminum.

9. The process of claim 1 wherein said metal is magnesium.

10. The process of claim 1 wherein said pressure wave is generated by an explosion.

11. The process of claim 1 wherein said metal azide is present in excess amounts.

12. The process of claim 1 wherein said pressure wave is propagated with a gas gun.

13. A process for producing wurtzitic or cubic boron nitride comprising the steps of:

[A] preparing an intimate mixture of powdered boron oxide, a powdered metal selected from the group consisting of magnesium and aluminum, and a powdered metal azide;

[B] igniting said mixture and bringing it to a temperature at which self-sustaining combustion occurs;

[C] shocking said mixture at the end of the combustion thereof, while said mixture is still at a temperature at which self-sustaining combustion occurs with a high pressure wave generating a pressure of at least about 100 kbar on said mixture, thereby forming as a reaction product, wurtzitic or cubic boron nitride and occluded metal oxide.

14. The process of claim 13 wherein said mixture in (B) is heated to a temperature of at least about 1800° C.

15. The process of claim 13 wherein said occluded metal oxide is MgO and is removed by leaching said reaction product with HCl.

16. The process of claim 13 wherein prior to ignition, said mixture is compacted together.

17. The process of claim 13 wherein said mixture of (A) has a particle size ranging from about 10 to about 30 microns.

18. The process of claim 13 wherein said powdered boron oxide, powdered metal, and powdered metal azide are initially present in stoichiometric ratios.

19. The process of claim 13 wherein said metal azide is sodium azide.

20. The process of claim 13 wherein said metal is aluminum.

21. The process of claim 13 wherein said metal is magnesium.

22. The process of claim 13 wherein said pressure wave is generated by an explosion.

23. The process of claim 13 wherein said metal azide is present in excess amounts.

24. The process of claim 13 wherein said pressure wave is propagated with a gas gun.

* * * * *